Sept. 24, 1968   W. HENNEL   3,403,000
PROCESS FOR AMMONIA SYNTHESIS AND EQUIPMENT FOR THIS PROCESS
Filed July 6, 1965   3 Sheets-Sheet 3

United States Patent Office 3,403,000
Patented Sept. 24, 1968

3,403,000
PROCESS FOR AMMONIA SYNTHESIS AND EQUIPMENT FOR THIS PROCESS
Waclaw Hennel, Swierczewskiego 7, Kedzierzyn, Poland
Filed July 6, 1965, Ser. No. 469,612
Claims priority, application Poland, Sept. 18, 1964, 105,760
2 Claims. (Cl. 23—199)

ABSTRACT OF THE DISCLOSURE

The process of utilizing the heat of reaction in the course of synthesis of ammonia by vaporizing previously produced and liquefied ammonia by heating the liquefied ammonia by means of the output stream from the synthesis reaction zone, then superheating the vaporized ammonia. The superheated ammonia is used as driving means in a turbine which drives a compressor for pressurizing the reaction gases prior to introduction into the reaction zone.

---

In the known processes for high pressure, catalytic ammonia snythesis, the removed reaction heat is either not at all utilized, or used to produce low-pressure steam which cannot be employed for performance of work but only for heating purposes outside the ammonia synthesis plant.

The object of the invention is the use of ammonia, obtained from the process, for the removal of the reaction heat from the outlet-gas under the same or similar pressure, under which the ammonia was liquefied from this gas, and utilization of the superheated high-pressure ammonia vapour for the performance of work. Then the ammonia vapour can be liquefied again if needed.

Figure 1:
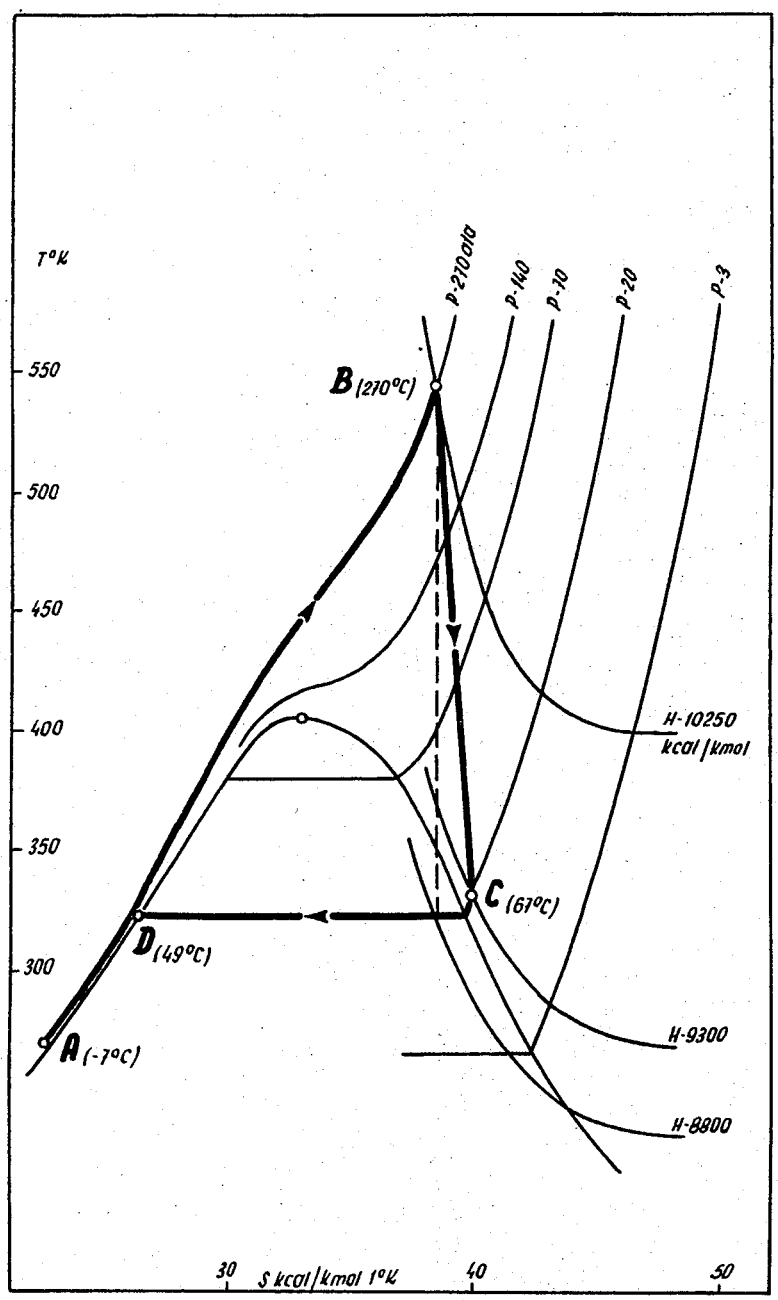

In FIG. 1 an example of the thermodynamic changes occurring in the invented process has been shown on a temperature-entropy diagram. The A–B line represents isobaric heating of ammonia under a pressure similar to that under which it has been liquefied from the outlet-gas, the B–C line shows the expansion with work performance and C–D represents condensation.

The application of the invented process is particularly advantageous where the obtained work is used for the compression of gas within the same ammonia plant. The use of the end product of the ammonia process for transformation of heat into work employed in the same process, makes a remarkable simplification of the equipment possible and, what is of even greater importance, allows a wider application of turbo-compressors instead of piston compressors.

The basic equipment for carrying out the invention is a heat exchanger, or boiler, as it is called in the present description. In the boiler the outlet-gas transfers the reaction heat to ammonia under pressure. The walls of the boiler for this purpose have a very small difference of pressures to resist which amounts to several atmospheres and not the full high pressure used in ammonia synthesis, as in the case of boilers utilizing the reaction heat for steam production. Owing to that, the ammonia boiler is much smaller and cheaper and can be easily placed entirely or partially within the reactor vessel.

An essential element of the equipment of the present invention is the aggregate for the utilization of the work of expansion of ammonia. This aggregate is composed of a turbine and a turbo-compressor, enclosed in one common high-pressure shell. The shaft of the aggregate is placed entirely within the shell and thus the problem of sealing the shaft is solved, which is the main difficulty in the use of turbo-compressors in these high pressure conditions. The pressure difference between the turbine and the compressor in the place where they meet is, when both parts are adequately situated, not higher than several atmospheres. The sealing of the shaft against such a small pressure difference forms no difficulty and the handling of similar media on both sides allows even some leakage. The turbine drive of the turbo-compressor makes it possible to use a several times higher rotation speed than than that of the known electric driven high-pressure turbo-compressor. This results in a very small size of both, the turbo-compressor and the turbine.

In the equipment according to the invention, the turbine-turbo-compressor aggregate can be used preferably for circulating the reaction-gas within the synthesis loop. Another possible application is that for compression of the fresh synthesis gas. So far it has not been possible to use turbo-compressors alone to compress fresh gas for the ammonia synthesis.

In the known equipment the turbo-compressor compresses fresh synthesis gas up to 100–200 atmospheres at the most, and further compression is performed by means of a piston compressor. The aggregate which, according to the invention, utilizes the heat energy of the superheated ammonia, is particularly suited for final-stage compression of fresh synthesis gas without the need of using piston-compressors.

A modification of the equipment according to the invention has an injector, by means of which the work performed by the superheated high-pressure ammonia is utilized in the refrigerating system of the ammonia synthesis plant. Applying ammonia as the refrigerating, as well as driving medium, results in a remarkable simplification of the design and cost-reduction of the equipment.

Figure 2:
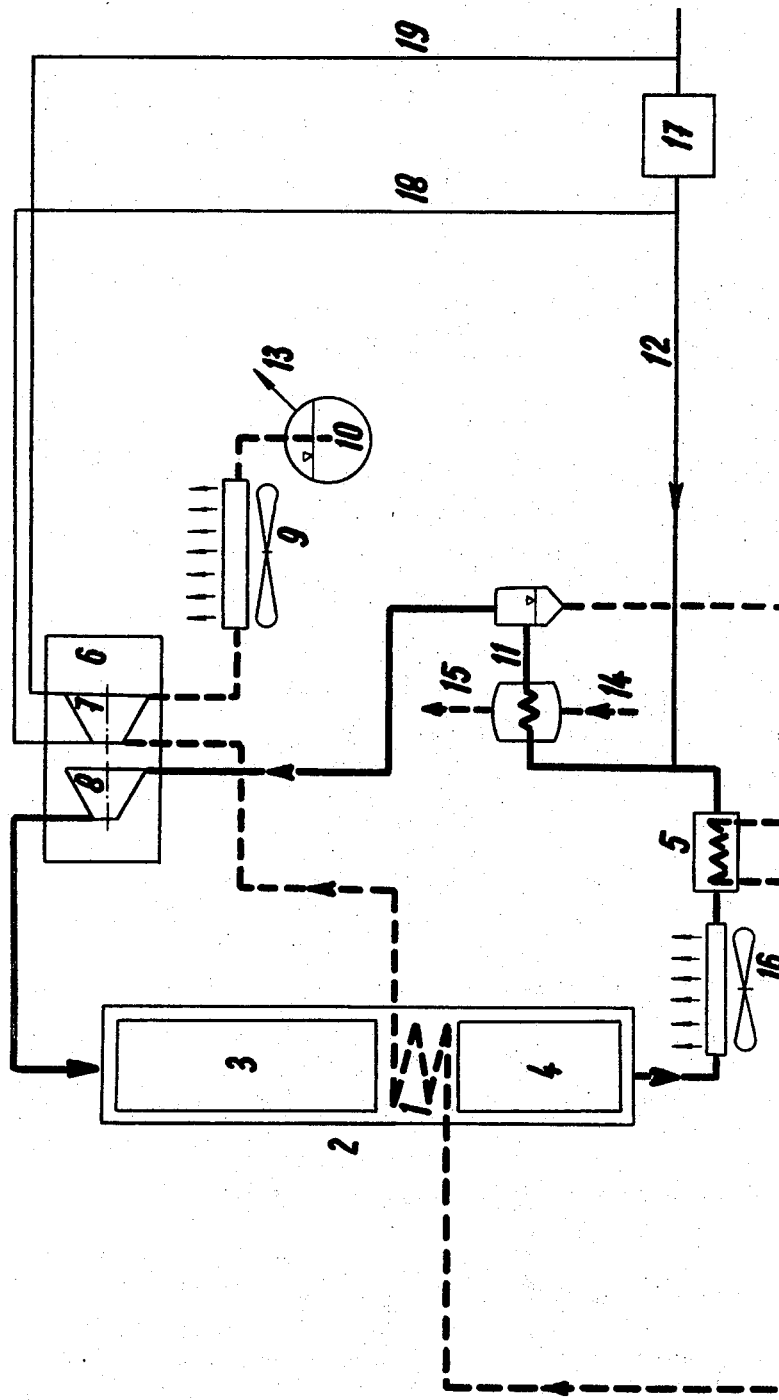
Figure 3:
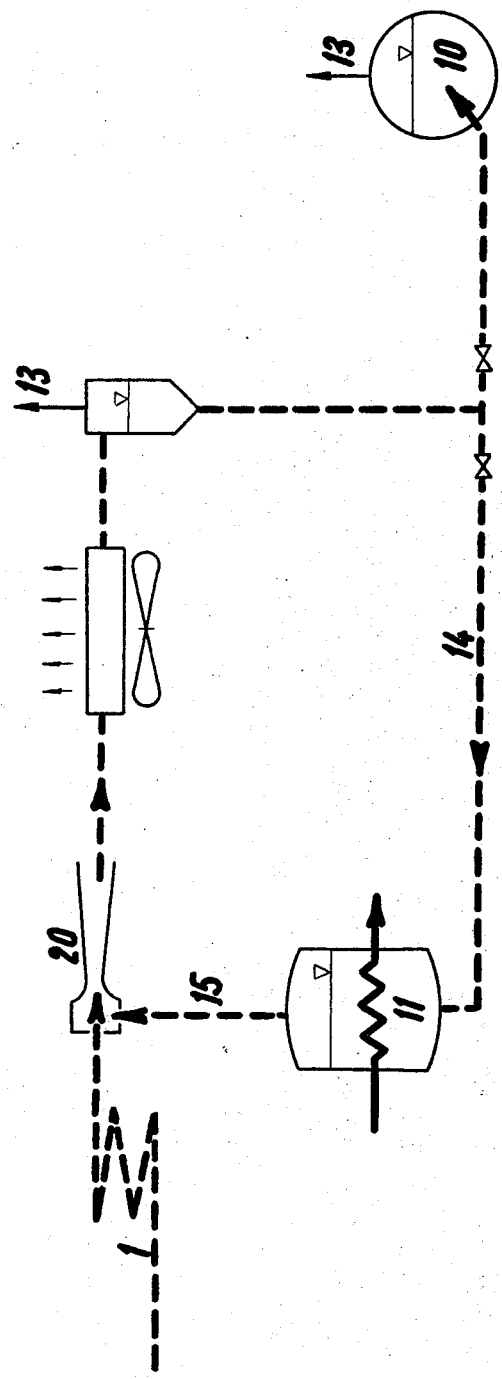

The equipment which is the object of this invention is presented in flowsheets, where FIG. 2 shows the equipment with the turbine-turbo-compressor aggregate used for the circulation of the gas within the ammonia synthesis loop, and FIG. 3 presents the type with the injector.

The boiler 1 placed inside the pressure vessel 2 of the reactor which is composed of the catalyst chamber 3 and the heat-exchanger 4 are shown in FIG. 2. The boiler 1 is supplied with ammonia through the preheater 5. The turbine 7 and the turbo-compressor 8, enclosed in one common high-pressure shell 6, form an aggregate for the circulation of the gas in the synthesis loop. The condenser 9 condenses the ammonia after it has performed work. The product is collected in the collector 10. The conventional system for refrigeration and separation is presented in simplified form and denoted as 11. The conduit 12 brings the fresh synthesis gas. The waste gas is lead out by conduit 13. Ammonia acting as the refrigerating medium is lead in and out by conduits 14 and 15. The water or air condenser for the outlet gas is numbered 16 and the compressor for the fresh gas is 17. The conduits 18 and 19 are used for driving the turbine 7 while starting the plant.

In FIG. 3 only a part of the equipment for ammonia synthesis is presented to show the modification of the equipment. The elements shown here have the same detonation as in FIG. 2. The driving conduit of the injector 20 is connected with the boiler 1, its suction conduit is connected with ammonia evaporator belonging to system 11, and its outlet conduit with condenser 9.

Example 1

The equipment for the ammonia synthesis process according to the present invention, shown in flow sheet 2, operates at the pressure of 350 atmospheres and produces 600 t. ammonia per day. The volume of the gas in the synthesis loop in the suction stage of its circulation compressor amounts to 1000 m.$^3$/h., the compression power of the gas from 320 to 350 atmospheres by means of a turbo compressor is practically ca 1000 kw. The expansion power of the 600 t./d. ammonia from the state marked as B in FIG. 1 to that denoted as C amounts to 1600 kw., so that the balance is maintained even by a low mechanical efficiency (62%) of the turbine.

Example 2

The equipment for the ammonia synthesis process according to the invention operates under the pressure of 350 atmospheres and produces 600 t./d. ammonia. (A part of the equipment is shown in FIG. 2.) The expansion of the superheated ammonia is carried out in the injector which gives the cooling effect of 2,320,000 kcal./h. by temperatures of −2° C. in the evaporator and +49° C. in the condenser.

I declare that what I claim is:

1. In the process of synthesizing ammonia wherein nitrogen and hydrogen are reacted at high temperature and pressure conditions by being circulated and re-cycled through a reaction zone until they form ammonia and the thereby produced ammonia is liquefied, the improvement comprising subjecting said ammonia to indirect heat exchange relationship to the circulating output from the reaction zone at its liquefying pressure, then further heating the ammonia by passing the ammonia into the reaction zone in a manner so that it is in indirect heat exchange relationship with the circulating reactants in the reaction zone, thereafter passing the thereby heated ammonia to means for achieving driving motion, utilizing said driving motion to pressurize the reaction gases prior to introduction into the reaction zone.

2. The method of claim 1 wherein the ammonia is transformed into vapour while achieving said driving motion, and obtaining liquid ammonia by cooling said vapour.

References Cited

FOREIGN PATENTS 28,832    1913    Great Britain.

OSCAR R. VERTIZ, *Primary Examiner.*

H. S. MILLER, *Assistant Examiner.*